United States Patent [19]

Nagura et al.

[11] Patent Number: 5,416,206
[45] Date of Patent: May 16, 1995

[54] MODIFIED XANTHAN GUM AND METHOD FOR MODIFYING XANTHAN GUM

[75] Inventors: Shigehiro Nagura; Kanji Murofushi; Kazumasa Maruyama, all of Niigata, Japan

[73] Assignee: Shin-Etsu Chemical Co., Ltd., Tokyo, Japan

[21] Appl. No.: 984,215

[22] Filed: Nov. 30, 1992

[30] Foreign Application Priority Data

Dec. 4, 1991 [JP] Japan .................................. 3-320289

[51] Int. Cl.⁶ .................... C08B 37/00; C07H 1/00; C07H 3/06
[52] U.S. Cl. .................................. 536/114; 536/123; 536/124
[58] Field of Search .................... 536/114, 124, 123

[56] References Cited

FOREIGN PATENT DOCUMENTS 0375099  6/1990  European Pat. Off. .
0514890  11/1992  European Pat. Off. .
1575756  6/1969  France .

*Primary Examiner*—David A. Redding
*Assistant Examiner*—Everett White
*Attorney, Agent, or Firm*—McAulay Fisher Nissen Goldberg & Kiel

[57] ABSTRACT

A modified xanthan gum has a viscosity of not less than 800 cP as determined on a 0.5% by weight solution thereof in a 12% by weight aqueous sodium chloride solution at 20° C. and a ratio of this viscosity to that determined on a 0.5% by weight solution thereof in distilled water of not less than 1.5. The modified xanthan gum can be prepared by a method comprising the steps of mixing an organic solvent which does not dissolve xanthan gum and is hydrophilic with an aqueous solution of xanthan gum in a mixer, cutting, into fine fibrous materials, deposites formed in the mixed solution together with the mixed solution with a cutter, separating and recovering the suspended fine fibrous materials from the mixed solution and then drying the materials at a temperature of not more than 80° C. The modified xanthan gum can directly be dissolved in aqueous solutions of salts such as common salt even at room temperature and can thus easily show a desired effect of thickening the aqueous salt solutions.

11 Claims, 1 Drawing Sheet

MODIFIED XANTHAN GUM AND METHOD FOR MODIFYING XANTHAN GUM

BACKGROUND OF THE INVENTION

The present invention relates to a modified xanthan gum which can directly be dissolved in an aqueous salt solution to thus impart a desired viscosity to the salt solution and a method for modifying xanthan gum.

Xanthan gum is a naturally-occurring high molecular weight polysaccharide produced by microorganisms such as *Xanthomonas campestris*, the aqueous solution thereof is stable over a wide pH range and likewise stable to salts and enzymes. Xanthan gum can be dissolved in aqueous solutions of salts and quite effectively serves to increase the viscosity of the aqueous salt solutions. For this reason, xanthan gum has widely been used in various field such as food industries and chemical industries. It has intensively been desired to uniformly dissolve xanthan gum in common salt aqueous solutions in particular in the food industries.

If xanthan gum is once dissolved in an aqueous solution of a salt, it shows a stable thickening effect. It is very difficult to completely dissolve xanthan gum in a solvent at a temperature of not more than room temperature if the solvent is an aqueous salt solution, in particular that having a high salt-concentration. There have been known several methods for dissolving xanthan gum in aqueous salt solutions.

For instance, one example thereof comprises two-stage operations. More specifically, this method comprises dissolving xanthan gum in water free of salts and then adding a desired salt to the xanthan gum solution. In addition, there has also been known a method comprising partially (about half) dissolving xanthan gum in an aqueous salt solution and then heating the partially dissolved xanthan gum solution.

In addition to the foregoing methods, there have been proposed a variety of methods for making the dissolution of xanthan gum in water easy. Examples thereof are a method in which xanthan gum is treated with a surface active agent (Japanese Patent Provisional Publication No. 63-230703); a method comprising admixing a water-retention material with xanthan gum (Japanese Patent Application Publication No. 60-4214); a method comprising covering xanthan gum with hydrolyzed gelatin (Japanese Patent Application Publication No. 1-159048); a method comprising incorporating a wetting agent and a dispersant into the aqueous salt solution (Japanese Patent Provisional Publication No. 63-54490); a method comprising incorporating silica into the aqueous salt solution (Japanese Patent Provisional Publication No. 57-3834); a method comprising treating xanthan gum with glyoxal (Japanese Patent Application Publication No. 61-61800); and a method comprising incorporating a cold water-soluble gum into xanthan gum treated with glyoxal (Japanese Patent Provisional Publication No. 56-92956).

If the foregoing two-stage method comprising the step of preliminarily dissolving xanthan gum in water free of salt is adopted for increasing the viscosity of an aqueous salt solution, complicated procedures are inevitably required. Moreover, xanthan gum cannot be uniformly dissolved in an aqueous salt solution even if a solution containing partially dissolved xanthan gum is heated over a long time period with stirring. In other words, part of xanthan gum still remains in the resulting solution as undissolved particles.

The foregoing methods which comprise the addition of third components such as surface active agents, water-retention materials, gelatin, wetting agents, dispersants and silica only show an effect of preventing the formation of undissolved lumps in water, but never provide xanthan gum which can directly be dissolved in an aqueous salt solution to thus thicken the salt solution.

As has been discussed above in detail, the conventional xanthan gum suffers from a problem that it is very hardly soluble in aqueous salt solutions.

SUMMARY OF THE INVENTION

An object of the present invention is to provide a modified xanthan gum which can directly be dissolved in aqueous solutions of salts such as common salt even at room temperature and can thus easily show a desired effect of thickening the aqueous salt solutions. Another object of the present invention is to provide a method for modifying the physical properties of xanthan gum.

The modified xanthan gum according to the present invention has a viscosity of not less than 800 cP as determined, on a 0.5% by weight solution thereof in a 12% by weight aqueous sodium chloride solution, at a number of revolution of 30 rpm and 20° C. using a Brookfield BL viscometer and a ratio of this viscosity to that determined on a 0.5% by weight solution thereof in distilled water of not less than 1.5.

The method for modifying xanthan gum according to the present invention comprises the steps of mixing an organic solvent which does not dissolve xanthan gum and is hydrophilic with an aqueous solution of xanthan gum in a mixer, cutting, into fine fibrous materials, deposites formed in the mixed solution together with the mixed solution with a cutter, separating and recovering the suspended fine fibrous materials from the mixed solution and then drying the materials at a temperature of not more than 80° C.

The modified xanthan gum or the product obtained according to the method for modifying xanthan gum can directly be dissolved in aqueous solutions of salts such as common salt even at room temperature and can thus effectively show a desired effect of thickening the aqueous salt solutions.

The xanthan gum thus modified according to the present invention makes it possible to eliminate the use of any complicated operation required when dissolving xanthan gum in an aqueous salt solution. In addition, the modified xanthan gum can likewise be directly dissolved in sea-water to thus effectively thicken the sea-water. These effects have never been accomplished by any conventional xanthan gum. Therefore, the modified xanthan gum of the present invention has a quite high industrial value.

DETAILED EXPLANATION OF THE INVENTION

Figure 1:
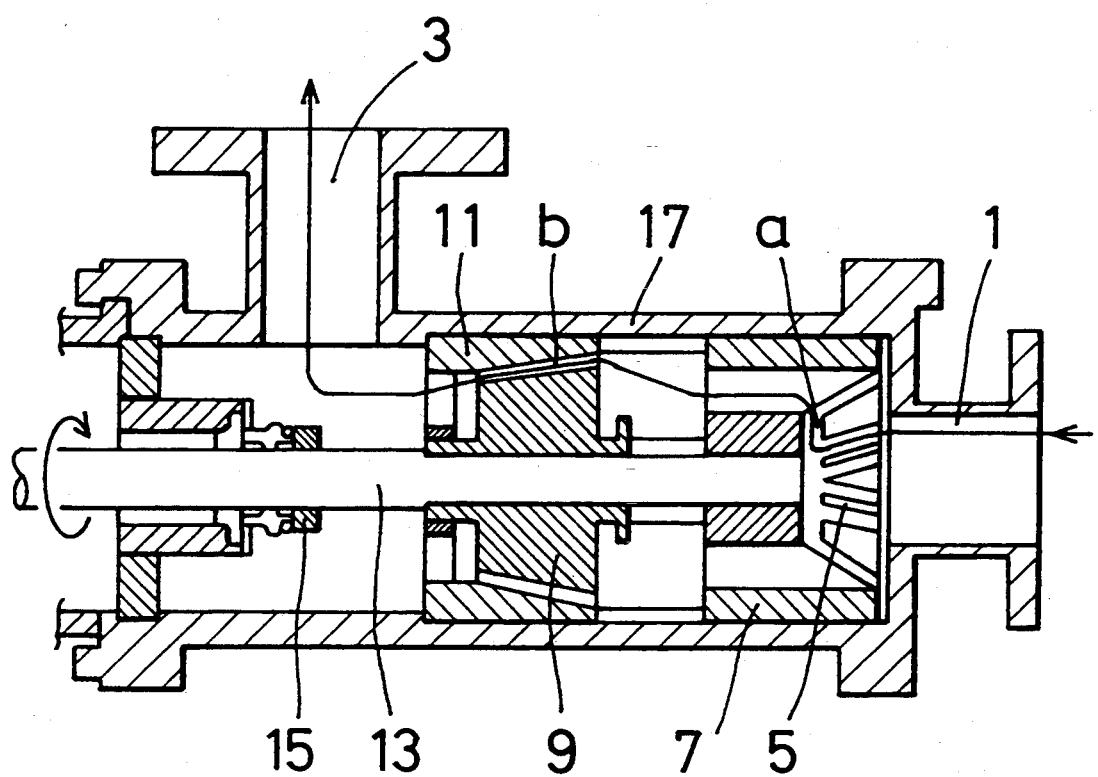
FIG. 1 is a cross sectional view of a pump mill used in the method for purifying xanthan gum according to the present invention.

When an organic solvent and an aqueous solution of xanthan gum are mixed in a rotary turbine 5, the xanthan gum is deposited. The deposited xanthan gum is cut, into fine fibrous materials, with an interlocking cutter comprising a fixed cutter 11 and a rotary cutter 9 to thus form a suspension in which the fibrous materials are uniformly dispersed. Then liquid components of the suspension is removed to recover the crude fine fibrous xanthan gum component. The crude product is then dried at a temperature of not more than 80° C. to give intended modified xanthan gum capable of being directly dissolved in an aqueous salt solution in order to increase the viscosity of the aqueous salt solution.

The organic solvent mixed with the aqueous xanthan gum solution should be a hydrophilic solvent which does not dissolve xanthan gum and specific examples thereof include alcohols such as isopropyl alcohol, methanol and ethanol; and other solvents such as acetone, tetrahydrofuran and dioxane, with isopropyl alcohol being preferably used.

According to the method of the present invention, the fine fibrous materials separated and recovered from the suspension are dried at a temperature of not more than 80° C. This is because, if the drying temperature is higher than 80° C., the solubility of the resulting xanthan gum in an aqueous salt solution is lowered.

The xanthan gum thus prepared is highly soluble in aqueous salt solutions such as an aqueous common salt solution. The xanthan gum thus obtained preferably has a viscosity (1) of not less than 800 cP as determined at 20° C. on a 0.5% by weight solution thereof in a 12% by weight aqueous sodium chloride solution and a ratio of this viscosity (1) to that (2) determined on a 0.5% by weight solution thereof in distilled water: (1)/(2) of not less than 1.5.

The viscosity is determined at a number of revolution of 30 rpm using a Brookfield BL viscometer.

The preferred examples of the present invention will hereinafter be described, but the present invention is not restricted to these specific Examples.

EXAMPLE 1

FIG. 1 is a cross sectional view of a pump mill used in the method for purifying xanthan gum according to the present invention.

The pump mill shown in FIG. 1 comprises a driving zone, a mixing zone and cutting zone. The driving zone comprises a motor (not shown), connected to a turbine shaft 13 fitted to the exterior of a cylindrical casing 17 and separated from the interior of the cylindrical casing 17 through a mechanical seal 15. The mixing zone and the cutting zone are located within the cylindrical casing 17. The cylindrical casing 17 is provided with a suction opening 1 and a discharge opening 3 and the turbine shaft 13 is positioned at the center thereof. The mixing zone comprises a rotary turbine 5 fitted to the turbine shaft 13 in the vicinity of the suction opening 1 and a stator 7 located at the position opposite to the rotary turbine 5. The cutting zone is constituted by an interlocking cutter comprising a rotary cutter 9 fitted to the turbine shaft 13, which is adjacent to the mixing zone and extends to the discharge opening 3 and a fixed cutter 11 which comes in close contact with the rotary cutter 9 and surrounds the rotary cutter 9. The rotary turbine 5 and the rotary cutter 9 have spiral shapes and are tilted towards the axis of the turbine shaft 13 so that the force of transportation is generated as the turbine shaft 13 rotates.

A gap a exists between the rotary turbine 5 and the stator 7 while a gap b exists between the rotary cutter 9 and the fixed cutter 11. The size of these gaps in general ranges from 0.1 to 5 mm and preferably on the order of about 1 mm. If the size of the gaps exceeds 5 mm, these two kinds of solutions are not sufficiently admixed and this results in the reduction of the amount of xanthan gum deposited. Moreover, the deposited xanthan gum is not sufficiently finely cut in the cutting zone.

Flow paths are formed, within the pump mill, by gaps of each part and gaps between parts and thus liquids are transferred from the suction opening 1 to the discharge opening 3 through the flow path such as that denoted by an arrow.

In the pump mill, when the motor of the driving zone is started, the turbine shaft 13 correspondingly rotates in the direction represented by an arrow and the rotary turbine 5 and the rotary cutter 9 likewise rotate. It is sufficient, in the present invention, to adjust the number of revolution of the turbine shaft and hence those of the rotary turbine and the rotary cutter to not less than 1,000 rpm. If an organic solvent and an aqueous solution of xanthan gum are simultaneously supplied to the pump mill through the suction opening 1, these two kinds of liquids are admixed together by the action of the rotary turbine 5. The resulting mixed solution is compressed during passing through the gap a so that the mixed solution is further admixed and xanthan gum is deposited. The xanthan gum deposited at this stage is in the form of strings, but can pass through the gap a together with the liquid components and is transferred, through the flow path, to the gap b of the cutting zone in which the deposited xanthan gum is cut into fine fibrous materials by the interlocking cutter comprising the rotary cutter 9 and the fixed cutter 11. Fine particulate xanthan gum obtained in the gap b is mixed with the liquid components and discharged through the discharge opening 3 in the form of a suspension. The pump mill exerts a suction pressure and discharge pressure on the solutions or liquids to be processed and, therefore, the mixed solution and the deposited xanthan gum are continuously transported from the suction opening 1 to the discharge opening 3 without causing any retention.

The foregoing pump mill was operated while setting the numbers of revolution of the rotary turbine 5 and the rotary cutter to 2,000 rpm and the size of the gap b to 1 mm and a culture medium containing xanthan gum in a concentration of 3% by weight and isopropanol having a water content of 15% by weight were simultaneously injected into the pump mill through the suction opening 1 at feed rates of 1,000 l/hr and 1,500 l/hr respectively. The suspension discharged through the discharge opening 3 was free of string-like xanthan gum and was a uniform dispersion. The suspension was transferred to the subsequent step to separate and recover fine fibrous materials from the suspension. More specifically, the fine fibrous materials could be purified through dehydration and drying processes to give highly pure xanthan gum.

The deposited xanthan gum (15 kg) was dried at a drying temperature ranging from 40° to 65° C. and a drying pressure ranging from 40 to 100 Torr over 5 hours in a 100L Conical Type vacuum dryer. Then the xanthan gum was pulverized into fine particulate modified xanthan gum of not less than 80 mesh.

The modified xanthan gum thus obtained (1 g) was introduced into a 300 ml tall beaker and swollen by the addition of 3 g of 99% ethanol. Then 196 g of a 12% by weight aqueous sodium chloride solution maintained at 20° C. was added to the mixture and the resulting mixture was stirred at 1,000 rpm for 2 hours using an anchor blade having an outer diameter of ½ time the inner diameter of the beaker. It was thus confirmed that the modified xanthan gum was uniformly dissolved therein and the viscosity of the aqueous sodium chloride solution was increased.

The solution thus obtained was allowed to stand at 20° C. for one hour and then the viscosity thereof was determined using a Brookfield BL Type viscometer. The viscosity was determined at a rotational number of viscometer of 30 rpm and at the spindle No. 2 and was found to be 1,080 cP (viscosity (1)).

Then the modified xanthan gum was dissolved in distilled water to a concentration of 0.5% by weight. The viscosity of the resulting aqueous solution of the modified xanthan gum was determined at a rotational number of viscometer of 30 rpm and at the spindle No. 2 using a Brookfield BL Type viscometer and was found to be 560 cP (viscosity (2)). Thus, the viscosity ratio of these two kinds of solutions: (1)/(2) was 1.93.

Incidentally, it was found that the stirring velocity during dissolving the modified xanthan gum in an aqueous salt solution is preferably not less than 800 rpm. The shape of the stirring blade is not restricted to a specific one, but is preferably those capable of fluidizing whole the solution to be stirred. If the modified xanthan gum was dissolved under these conditions, the solution reached a stable viscosity within a stirring time on the order of about 60 minutes. It was also found out that any viscosity change was not observed even when the solution was further stirred for additional 2 to 12 hours.

COMPARATIVE EXAMPLE 1

The deposited xanthan gum (1 kg) obtained in the same manner used in Example 1 was dried at a temperature exceeding 85° C. for 5 hours using an air-circulating dryer and then pulverized into fine particulate xanthan gum of not less than 80 mesh. The viscosity of the resulting fine particulate xanthan gum was determined in the same manner used in Example 1 and found to be 360 cP for viscosity (1) (in aqueous salt solution), 520 cP for viscosity (2) (in distilled water) and 0.69 for the ratio (1)/(2) respectively.

In this example, a large amount of particles remained undissolved in the aqueous salt solution even after stirring for 2 hours. The stirring was further continued for up to additional 12 hours, but the undissolved particles were not dissolved at all.

COMPARATIVE EXAMPLE 2

A variety of xanthan gums commercially available each was dissolved in an aqueous salt solution according to Example 1 and the viscosity (1) thereof was determined in the same manner. Moreover, it was also dissolved in distilled water according to Example 1 and the viscosity (2) thereof was likewise determined. The results obtained (viscosity (1) and viscosity ratio: (1)/(2)) are summarized in the following Table 1.

In all of the cases examined, a large amount of particles remained undissolved in the aqueous salt solution even after stirring for 2 hours. The stirring was further continued for up to additional 12 hours, but the undissolved particles were not dissolved at all.

It was also found that any xanthan gum having a viscosity (1) of not less than 800 cP and the viscosity ratio: (1)/(2) of not less than 1.5 are not commercially available.

TABLE 1

| Sample Commercially Available (trade name) | Viscosity (1), cP | Viscosity (2), cP | Viscosity Ratio: (1)/(2) |
| --- | --- | --- | --- |
| Keltrol | 270 | 410 | 0.66 |
| Keltrol-T | 280 | 400 | 0.70 |
| Rhodigel | 120 | 270 | 0.44 |
| Neosoft XO | 210 | 680 | 0.31 |
| Neosoft XK | 480 | 550 | 0.87 |
| Soaxane 100 | 640 | 290 | 2.2 |

EXAMPLE 2

A 5% by weight aqueous solution of commercially available Keltrol-T (viscosity (1)=280 cP) used in Comparative Example 2 was used as a starting material and the solution was mixed with isopropanol in the same manner used in Example 1 to give deposited xanthan gum followed by drying and pulverization into fine particulate modified xanthan gum of not less than 80 mesh.

The resulting product had a viscosity (1) (in aqueous salt solution) of 820 cP, a viscosity (2) (in distilled water) of 400 cP and the viscosity ratio: (1)/(2) of 2.05. It was also confirmed that the product was highly soluble in aqueous salt solutions.

What is claimed is:

1. A saline soluble xanthan gum having a viscosity of not less than 800 cP as determined on a 0.5% by weight solution thereof in a 12% by weight aqueous sodium chloride solution at 20° C. at 30 rpm using a Brookfield BL viscometer and having a ratio of this viscosity to that determined on a 0.5% by weight solution thereof in distilled water of not less than 1.5.

2. The saline soluble xanthan gum of claim 1 obtained by the steps of
   mixing an organic solvent which does not dissolve xanthan gum and is hydrophilic with an aqueous solution of xanthan gum in a mixer,
   cutting, into fine fibrous materials, deposits formed in the mixed solution together with the mixed solution with a cutter,
   separating and recovering the suspended fine fibrous materials from the mixed solution and then
   drying the materials at a temperature of not more than 80° C.

3. The saline soluble xanthan gum of claim 2 wherein the organic solvent is at least one member selected from the group consisting of isopropyl alcohol, methanol, ethanol, acetone, tetrahydrofuran and dioxane.

4. The saline soluble xanthan gum of claim 2 wherein the organic solvent is isopropyl alcohol.

5. The saline soluble xanthan gum of claim 2 wherein the mixer is a rotary turbine.

6. The saline soluble xanthan gum of claim 2 wherein the cutter is an interlocking cutter comprising a fixed cutter and a rotary cutter.

7. A method for making saline soluble xanthan gum comprising the steps of mixing an organic solvent which does not dissolve xanthan gum and is hydrophilic with an aqueous solution of xanthan gum in a mixer, cutting, into fine fibrous materials, deposits formed in the mixed solution together with the mixed solution with a cutter, separating and recovering the suspended fine fibrous materials from the mixed solution and then drying the materials at a temperature of not more than 80° C.

8. The method for making saline soluble xanthan gum as set forth in claim 7 wherein the organic solvent is at least one member selected from the group consisting of isopropyl alcohol, methanol, ethanol, acetone, tetrahydrofuran and dioxane.

9. The method for making saline soluble xanthan gum as set forth in claim 7 wherein the organic solvent is isopropyl alcohol.

10. The method for making saline soluble xanthan gum as set forth in claim 7 wherein the mixer is a rotary turbine.

11. The method for making saline soluble xanthan gum as set forth in claim 7 wherein the cutter is an interlocking cutter comprising a fixed cutter and a rotary cutter.

* * * * *